UNITED STATES PATENT OFFICE.

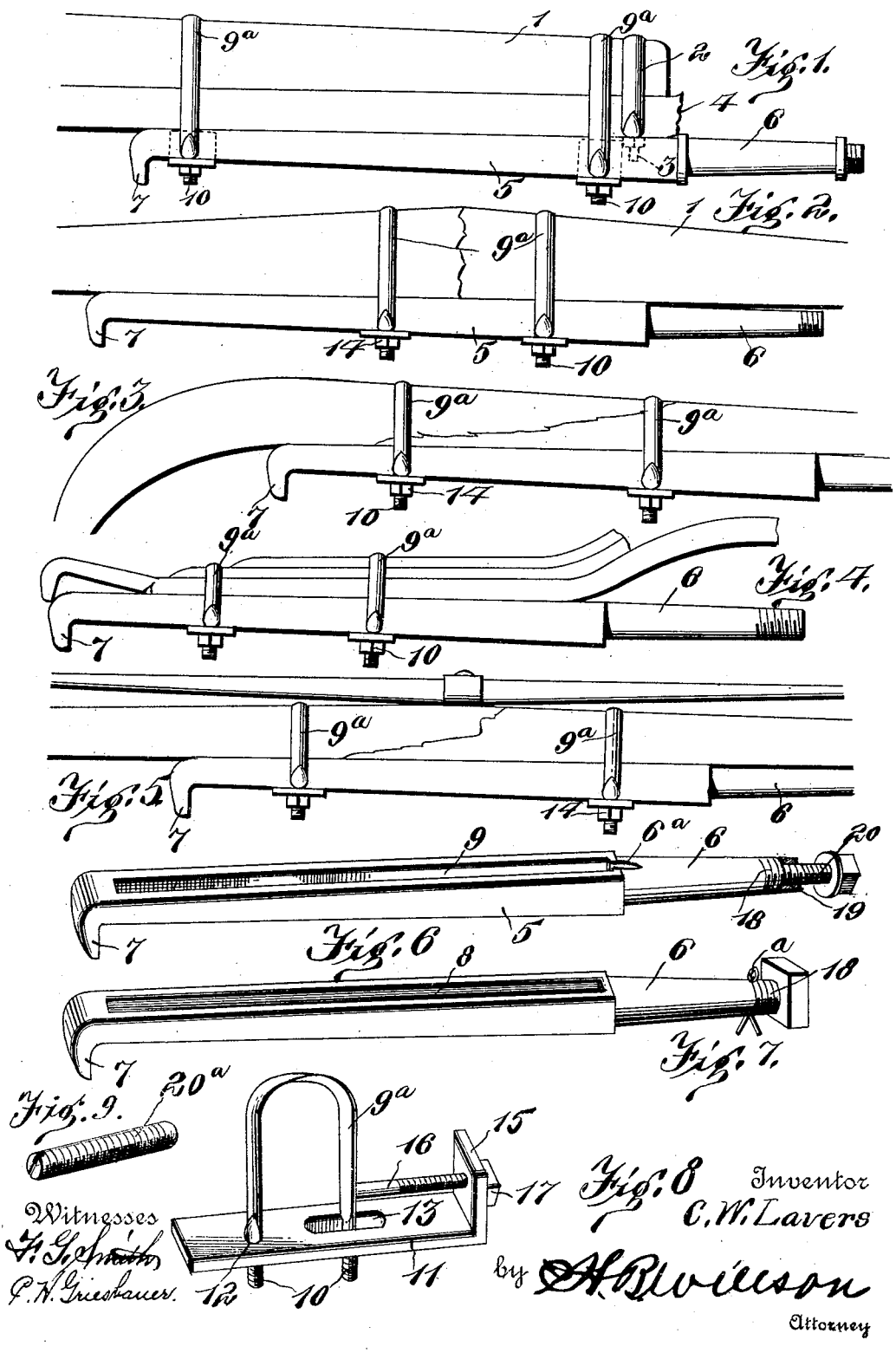

CHARLES W. LAVERS, OF HALIFAX, CANADA.

REPAIRING DEVICE FOR VEHICLES.

No. 809,192.

Specification of Letters Patent.

Patented Jan. 2, 1906.

Application filed July 20, 1905. Serial No. 270,538.

*To all whom it may concern:*

Be it known that I, CHARLES WILLIAM LAVERS, a subject of the King of Great Britain, residing at Halifax, in the Province of Nova Scotia and Dominion of Canada, have invented certain new and useful Improvements in Repairing Devices for Vehicles; and I do declare the following to be a full, clear, and exact description of the invention, such as will enable others skilled in the art to which it appertains to make and use the same.

This invention relates to devices for repairing broken axles, shafts, or springs of wheeled vehicles; and one of the principal objects of the same is to provide a device of comparatively simple construction which can be quickly applied for repairing the broken parts of a wheeled vehicle.

Another object is to provide a device for this purpose which can be stored in a comparatively small space and which will be always ready for use whenever required and which can be quickly applied to a broken axle, shaft, or spring of any kind of wheeled vehicle.

These and other objects are attained by means of the construction illustrated in the accompanying drawings, in which—

Figure 1 is a side elevation of a vehicle-axle in which the wheel-spindle is broken, showing my repairing device in place thereon, said axle being broken away at one end. Fig. 2 is a similar view of the central portion of the broken vehicle-axle, showing my repairing device in place thereon for splicing the axle in the center. Fig. 3 is a side elevation of a broken vehicle-shaft having my repairing device secured thereto. Fig. 4 is a similar view of a broken vehicle-spring having my device secured thereto. Fig. 5 is a side elevation of a portion of a broken shaft-bar having my repairing device used as a splice therefor. Fig. 6 is a perspective view of my repairing device or splice-bar. Fig. 7 is a perspective view of my repairing device or splice-bar having a groove therein to accommodate the projecting end of a bolt used on axle-clips. Fig. 8 is a perspective view of one of my clips and the washer-plate and tightener therefor, and Fig. 9 is a detail perspective view of a screw used to fit the socket in the end of the axle under certain conditions.

Referring to the drawings for a more particular description of my invention, the numeral 1, Figs. 1 and 2, designates a vehicle-axle which may be of ordinary or any suitable construction, said axle being provided with the usual clip 2, having a projecting end 3. To repair an axle of this kind having a broken spindle 4, I provide a splice-bar or repairing device 5, having at one end a spindle 6 and at its opposite end a downwardly-projecting hook 7, for a purpose which will be presently explained. This splice-bar is provided with a longitudinally-disposed groove 8, or in place of this groove a slot 9 may be provided, and the purpose of the slot or the groove is to accommodate the centrally-projecting end 3 of the clip 2 in order that the splice-bar may lie flat against the under side of the axle. The slot 9 or the groove 8 may be found useful in repairing many parts of a vehicle, in that they will serve to admit the projecting end of a centrally-disposed bolt on the part to be repaired. Suitable clips 9, which are designed to pass around the axle and inclose the splice-bar, are provided, and these clips are secured at the required distance apart, depending upon the locality of the breakage and the extent thereof. The threaded lower ends 10 of these clips are passed through a washer-plate 11, said washer-plate having a perforation 12 for one of the threaded ends of the clip and a slot 13 for the other threaded end of said clip. When the nuts 14 are applied to the threaded ends and they are tightened up against the splice-bar, they are extremely liable to spread. In order to overcome this defect, I bend one of the ends 15 of the washer-plate to form a bearing for a screw-bolt 16, said screw-bolt having a squared head 17, to which a wrench may be applied for pressing the clip against the side of the repairing device, as will be understood.

In a device of this kind it becomes necessary to use a plate having a slot therein for one lug of the clip in order to make the device adjustable for various kinds of shafts, springs, axles, &c., of a vehicle. My clamping-screw makes it possible to use such an adjustable clip and to hold the same firmly in place against the splice-bar or axle.

Referring to Fig. 1, it will be seen that when my device is in place a wheel may be slipped upon the spindle and held in place either by a cotter-pin *a* or by means of a threaded nut, as will be presently described.

In Fig. 2 my repairing device is used as a splice-bar for repairing an axle which has been broken in the center, the hooked end and the spindle end of said splice-bar not being utilized in this view.

Referring to Fig. 3, it will be seen that a broken shaft may also be readily repaired or spliced by means of my device.

In Fig. 4 my device is shown as a repairer for a broken spring, the hooked end of the splice-bar being disposed outwardly for an obvious purpose.

In Fig. 5 I have shown the manner in which the splice-bar is used for repairing a broken cross-bar or shaft-bar of a vehicle.

Referring to Fig. 6, it will be seen that the outer end of the wheel-spindle may be threaded, as at 18, and also provided with a threaded socket at 19 for a threaded bolt 20. The purpose of this construction is that a device constructed in this manner may be used upon either end of an axle, since the threads on the outside of the axle may be right-hand threads, while the socket may be threaded with left-hand threads for the bolt. In this manner either end of the axle may be repaired and the wheel secured in place by a threaded device inclined to tighten by the action of the wheel.

In Fig. 9 I have shown a screw $20^a$, which is intended to be used instead of the bolt 20 when the repairer is applied to a broken axle at one side of the vehicle. The screw $20^a$ fits the socket and keeps dirt and grit out, and thus preserves the threads of said socket.

A groove $6^a$, square in cross-section, is formed in the repairer at a point near the inner end of the spindle 6, the purpose of said groove being to provide means for preventing the spindle 6 from turning in the hub in case of breakage of said spindle. A key may be driven in the groove $6^a$ to also engage the hub to hold the spindle in place while the bolt 20 or the axle-nut is being removed. The groove $6^a$ may also be used as an oil-duct for lubricating the axle.

Instead of using the bolt 20 to provide means for securing the repairer at either end of the axle I may use a double screw-thread in place of the thread 18—that is to say, I may form a right and left hand combination screw-thread, which will permit the repairer to be used at either end of the axle.

From the foregoing it will be obvious that with very slight modifications in size and contour my repairing device may be utilized on all kinds of wheeled vehicles—such as automobiles, carriages, cars, square trucks, express-wagons, hacks, lumber-wagons, and gun-carriages—and will be found very convenient, efficient, and desirable for the purposes designed.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a repairing device for vehicles, a splice-bar provided with a wheel-spindle at one end, a hook at the opposite end, and a central longitudinal recess, in combination with clips for securing said splice-bar to a broken portion of the vehicle, substantially as described.

2. A repairing device for vehicles comprising a splice-bar having a central longitudinal recess, an axle-spindle at one end and a hook at the other, and clamps for holding the same in place upon a broken portion of a wheeled vehicle, substantially as described.

3. A repairing device for vehicles comprising a splice-bar having a spindle at one end and clips for securing the splice-bar in place, said spindle having a threaded socket in its end to accommodate a threaded bolt, said spindle also having a threaded end of opposite pitch to the socket, substantially as described.

4. A repairing device for vehicles comprising a splice-bar having a wheel-spindle at one end, a hook at its opposite end, clips for securing the device in place, said spindle having a threaded outer end and a socket provided with threads of opposite pitch to the threads on the end of the spindle, and means for binding the clips against the splice-bar, substantially as described.

In testimony whereof I have hereunto set my hand in presence of two subscribing witnesses.

C. W. LAVERS.

Witnesses:
 BENJ. G. COWL,
 GEO. E. TERRY.